(12) United States Patent
Brok et al.

(10) Patent No.: US 8,677,125 B2
(45) Date of Patent: Mar. 18, 2014

(54) AUTHENTICATING A USER OF A COMMUNICATION DEVICE TO A WIRELESS NETWORK TO WHICH THE USER IS NOT ASSOCIATED WITH

(75) Inventors: Jacco Brok, Enschede (NL); Jeroen Van Bemmel, Leiden (NL)

(73) Assignee: Alcatel Lucent, Paris (FR)

( * ) Notice: Subject to any disclaimer, the term of this patent is extended or adjusted under 35 U.S.C. 154(b) by 1870 days.

(21) Appl. No.: 11/095,957

(22) Filed: Mar. 31, 2005

(65) Prior Publication Data
US 2006/0236105 A1 Oct. 19, 2006

(51) Int. Cl.
*H04L 9/00* (2006.01)

(52) U.S. Cl.
USPC .......................................... 713/169; 455/410

(58) Field of Classification Search
None
See application file for complete search history.

(56) References Cited

U.S. PATENT DOCUMENTS

| | | | |
|---|---|---|---|
| 7,142,851 B2* | 11/2006 | Zhang et al. | 455/426.2 |
| 7,272,381 B2* | 9/2007 | Aura | 455/410 |
| 7,440,573 B2* | 10/2008 | Lor et al. | 380/270 |
| 7,607,015 B2* | 10/2009 | Fascenda | 713/171 |
| 2003/0033524 A1* | 2/2003 | Tran et al. | 713/168 |
| 2003/0072451 A1* | 4/2003 | Pimentel et al. | 380/270 |
| 2004/0137901 A1* | 7/2004 | Hamasaki et al. | 455/436 |
| 2004/0181674 A1* | 9/2004 | Theimer | 713/182 |
| 2004/0235455 A1* | 11/2004 | Jiang | 455/411 |
| 2005/0059396 A1* | 3/2005 | Chuah et al. | 455/435.1 |
| 2005/0124288 A1* | 6/2005 | Karmi et al. | 455/3.01 |
| 2005/0177515 A1* | 8/2005 | Kalavade et al. | 705/52 |
| 2006/0064588 A1* | 3/2006 | Tidwell et al. | 713/169 |
| 2006/0068788 A1* | 3/2006 | Zivkovic | 455/436 |
| 2006/0165060 A1* | 7/2006 | Dua | 370/352 |

OTHER PUBLICATIONS

"Cisco Aironet 1200 Series Access Point" —Cisco Systems, Inc., 1992-2004.
"Key RADIUS/AAA Considerations for Hotspot Operators"—Funk Software, Inc., Jun. 2004.

* cited by examiner

*Primary Examiner* — Fikremariam A Yalew
(74) *Attorney, Agent, or Firm* — Davidson Sheehan LLP (57) ABSTRACT

The present invention provides a method and an apparatus for automating authentication of a user. In one embodiment, a method calls for detecting an authentication event at a wireless communication device to gain access to a first wireless network through an access point associated with the first wireless network, automatically obtaining a credential from a second wireless network in response to the authentication event, and authenticating the user based on the credential to establish a connection between the wireless communication device and the first wireless network. A client-server based communication system includes a client module at a wireless communication device for user authentication of a Wi-Fi device to a Wi-Fi network through an access point associated therewith. For the purposes of authentication, the client-server based communication system further includes a server module with which the client module may automatically exchange short message service messages over a wide area network.

26 Claims, 5 Drawing Sheets

AUTHENTICATING A USER OF A COMMUNICATION DEVICE TO A WIRELESS NETWORK TO WHICH THE USER IS NOT ASSOCIATED WITH

FIELD OF THE INVENTION

This invention relates generally to telecommunications, and more particularly, to wireless communications.

DESCRIPTION OF THE RELATED ART

Many communication systems provide different types of services to users of wireless devices. In a particular wireless service, wireless communication networks may enable wireless device users to exchange peer-to-peer and/or client-to-server messages, which may be simply text messages or include multi-media content, such as data and/or video. This exchange of messages involves establishment of a connection between a source device through a number of network routers that incrementally advance a message towards its destination to a target device.

For example, on a wide area network (WAN), a network address may identify a particular node (e.g., an access point). By examining a destination network address of a message, network routers forward the message along a path from the message's source to the message's destination. The WAN may include a wireless local area network (WLAN) that provides access to users at hotspots. For such access, a user may sign up via a Web browser, pay on-demand and/or be billed against an existing provider account. To securely transmit and/or receive messages over a wired or wireless LAN, user credentials may be exchanged before data transfer over a wireless connection. However, such data transfer in messages may not be secure enough for corporate users, or for individuals concerned about identity theft and security.

In a telecommunication system, messages, such as text, voice, image information or other data may be transmitted over an air interface between a pair of transmitting and receiving radio stations (e.g., a base station or a mobile unit, terminal, or station, respectively) within a frequency range. As one example, a Global System for Mobile Communication (GSM) system may use a frequency range of 900, 1800 or 1900 MHz. Likewise, a Universal Mobile Telecommunication System (UMTS) may use 2000 MHz. Other networks such as Code Division Multiple Access (CDMA) or GPRS may use a particular frequency range to transmit and receive messages over a wired or wireless LAN.

Generally, a wireless LAN includes a wireless access point (AP) that communicates with a network adapter to extend a wired LAN. A user with a Wi-Fi compliant wireless communication device may use any type of access point with any other brand of client hardware that also is based on the IEEE 802.11 standard. The term Wi-Fi, short for wireless fidelity is promulgated by the Wi-Fi Alliance to refer any type of the IEEE 802.11 standard based device or network, whether 802.11a, 802.11b, 802.11g, dual-band, and the like. The Wi-Fi Alliance is an industry alliance to promote wireless networking arrangements according to the IEEE 802.11 specification. Typically, however, any Wi-Fi compliant wireless communication device using the same radio frequency (RF) signal, for example, 2.4 GHz for 802.11b or 11g, 5 GHz for 802.11a may work with any other wireless communication device.

A conventional Wi-Fi network uses a radio frequency (RF) in the 2.4 Giga Hertz (GHz) range to transmit data between Wi-Fi-enabled, computing or communication devices and other processor-based devices including wireless communication-enabled networked devices. Each wireless communication-enabled networked device comprises a transceiver. The Wi-Fi network typically comprises a wireless router that communicates with a Wi-Fi-enabled computing or communication device, such as computer. Most common form of the Wi-Fi network is based on IEEE 802.11x standard (x: a, b, g, etc.). Depending on local regulations, the IEEE 802.11 standard allows use of up to fourteen Wi-Fi channels within the 2.4 GHz frequency range.

However, regardless of the frequency range usage or type of a network employed, before granting an access to a user of a wireless communication device to a WAN, the user is typically authenticated. Therefore, most deployed Wi-Fi hotspots require a user to authenticate by typing a user name and a password on a web page ("web-based login"). Besides such a web-based login, other solutions for authentication may be deployed, e.g., among others, an authentication process based on the IEEE 802.1x standard is also available. One advantage of the web-based login mechanism is that it requires no additional client software and works on every client device with a web browser. Disadvantages are that this mechanism requires user interaction, in some implementations the user name and password are transmitted in plain text which is vulnerable to password hijacking, e.g., Hyper Text Transfer Protocols connections are vulnerable to man-in-the-middle attacks or an attacker could pose as a valid access point and thus obtain the credentials.

To address some of these risks some operators use short message service (SMS) messages via a cellular network to supply the user with a one-time password or token ("access token"). A SMS message is a text message service that enables short messages of generally no more than 140-160 characters in length to be transmitted and received, for example, from a cell phone using a two-way text messaging service offered on digital networks via a network operator's message center or from the Internet, using a SMS gateway. To initiate this process, the user first sends an SMS message to a network operator or a service provider, possibly including the identification of the Wi-Fi hotspot, e.g. specified on the login web page. Within a short time, the user receives a SMS with the access token, which needs to be submitted, e.g. on the login web page of the Wi-Fi hotspot.

One disadvantage of this process is that a relatively large number of manual actions may be required from a user and the user should understand the process, and know a phone number to send the SMS. Even though, most users are familiar with use of SMS in a mobile environment, use of SMS via a General Packet Radio Service (GPRS) for GSM networks, UMTS or CDMA data card for other devices, such as laptop computers generally require use of additional software for sending and receiving SMS messages.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for authentication of a user. The method calls for detecting an authentication event at a wireless communication device to gain access to a first wireless network through an access point associated with the first wireless network, obtaining a credential from a second wireless network in response to the authentication event, and authenticating the user based on the credential to establish a connection between the wireless communication device and the first wireless network.

In another embodiment, a client-server based communication system to automate authentication of a user to a first wireless network, wherein the client-server based communication system is associated with a second wireless network. The client-server based communication system may comprise a client and a server. The client includes a storage storing instructions for detecting an authentication event at a wireless communication device to gain access to the first wireless network through an access point associated with the first wireless network, in response to the authentication event, automatically obtaining a credential from the second wireless network, and authenticating the user based on the credential to establish a connection between the wireless communication device and the first wireless network. The server may be adapted to communicate with the client for an operator. The server includes a storage storing instructions to automatically authenticate the user to the first wireless network in response to the authentication event by providing the credential in a signaling session with the client over the second wireless network for connecting the wireless communication device to the first wireless network.

In yet another embodiment, a client in a client-server based communication system to automate authentication of a user to a first wireless network, wherein the client is associated with a second wireless network. The client comprises a controller and a storage coupled thereto. The storage stores instructions for detecting an authentication event at a wireless communication device to gain access to the first wireless network through an access point associated with the first wireless network, in response to the authentication event, automatically obtain a credential from the second wireless network, and authenticate the user based on the credential to establish a connection between the wireless communication device and the first wireless network.

In still another embodiment, a server is associated with a wide area network in a client-server based communication system to automate authentication of a user to a network. The server comprises a controller and a storage coupled thereto. The storage stores instructions to automatically authenticate the user of a client to the first wireless network associated with an access point for an operator in response to an authentication event at a wireless communication device by providing a credential in a signaling session with the client over the second wireless network for connecting the wireless communication device to the first wireless network.

In a further embodiment, an article comprising a computer readable storage medium storing instructions that, when executed, to automate authentication of a user, cause a client-server based communication system to detect an authentication event at a wireless communication device to gain access to a first wireless network through an access point associated with the first wireless network, automatically obtain a credential from a second wireless network in response to the authentication event, and authenticate the user based on the credential to establish a connection between the wireless communication device and the first wireless network.

In one exemplary embodiment, an apparatus for automating authentication of a user comprises means for detecting an authentication event at a wireless communication device to gain access to a first wireless network through an access point associated with the first wireless network, means for automatically obtaining a credential from a second wireless network in response to the authentication event, and means for authenticating the user based on the credential to establish a connection between the wireless communication device and the first wireless network.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and apparatus is provided for automating authentication of a user of a wireless communication device to a wireless network to which the user is not associated with. The user of the wireless communication device may get automatically authenticated to one wireless network, such as to a particular Wi-Fi network of one or more Wi-Fi networks using credentials obtained with signaling via a another wireless network, such as a Wide Area Network (WAN) based on GPRS, UMTS, CDMA network protocols or the like. A client-server based communication system encompasses a client module at a wireless communication device, an access point associated with a Wi-Fi network and a server module for the WAN. Such an authentication may enable the user of the wireless communication device to access a Wi-Fi hotspot in a wireless LAN (WLAN). The client module may automate authentication of a user to the Wi-Fi network by exchanging messages, such as SMS messages over a wireless connection, i.e., a wireless connection in a signaling session between the wireless communication device and the wide area network or a packet-based data connection over a WAN may be used. Thus, the client-server based communication system simplifies accessing a Wi-Fi hotspot using a Wi-Fi user authentication to a first wireless network by sending and receiving SMS messages to obtain an a credential including an access token from a second wireless network. By reducing manual steps, a relatively fast and significantly simple authentication may be provided. Therefore, a desired user experience may substantially increase user-acceptance of a wireless communication device and/or a wireless service.

Figure 1:
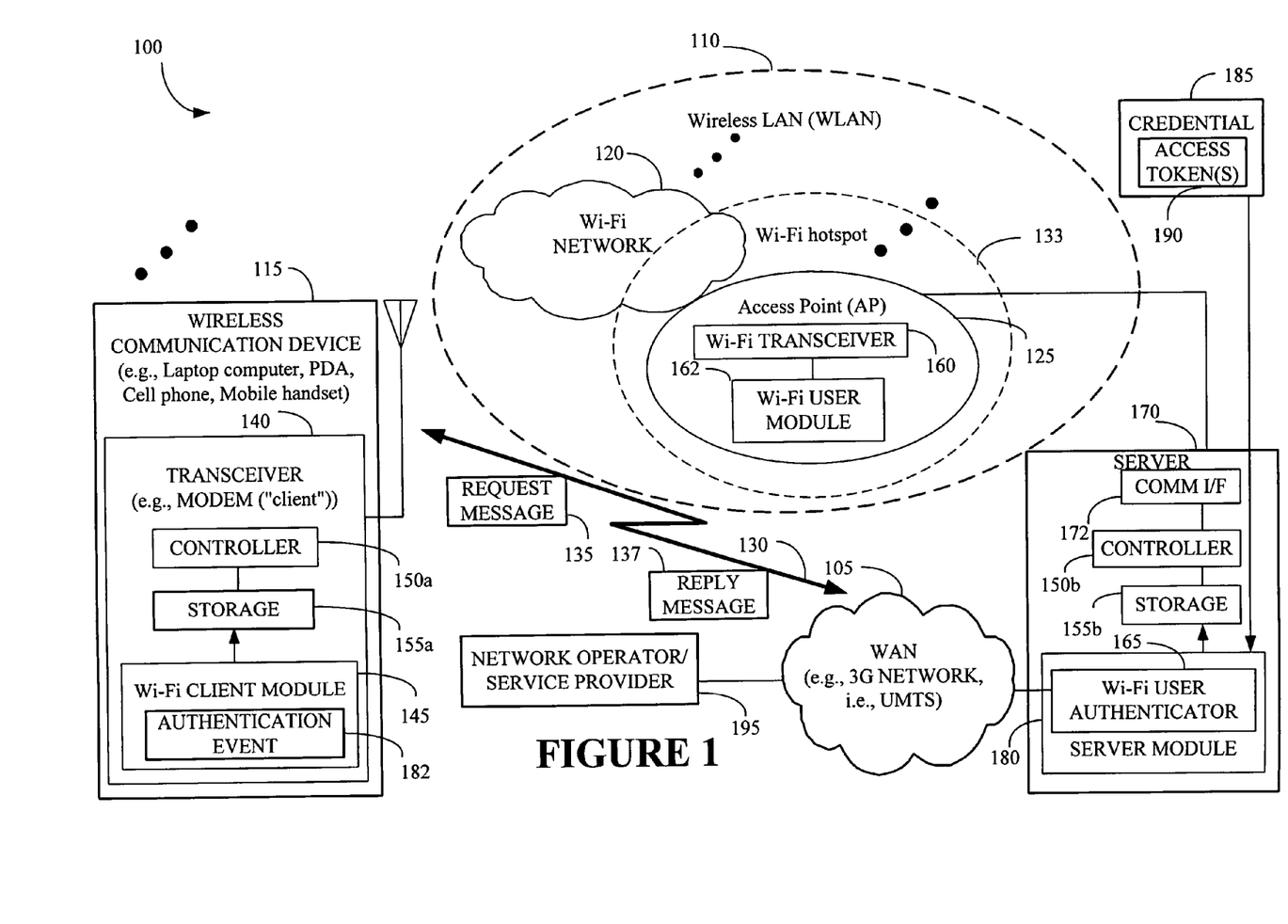
FIG. 1 schematically depicts a block diagram of a client-server based communication system associated with a network, such as a wide area network coupled to a wireless local area network for automating user authentication to a Wi-Fi network over a wireless connection in accordance with one embodiment of the present invention.

Referring to FIG. 1, a client-server based communication system 100 is schematically depicted to automate user authentication, in accordance with one embodiment of the present invention. For the purposes of automating authentication of a user to a first wireless network, such as a Wi-Fi network 120. In the client-server based communication system 100, the user may be associated with a second wireless network, such as a wide area network (WAN) 105 coupled to a wireless local area network (wireless LAN or WLAN) 110 trough a server. To automate authentication of the user, the client-server based communication system 100 may cause the user of a wireless communication device 115 to exchange messages, such as SMS messages with the WAN 105. In another embodiment, General Packet Radio Service (GRPS) for a Global System for Mobile Communications (GSM) network may be used to send a request message to a server over the WAN 105 to login onto the Wi-Fi network 120. That is, a GSM/GPRS data connection may be used for exchanging Internet Protocol (IP) data packets.

However, a wireless environment may include a multiplicity of access points that supports the Wi-Fi network 120. That is, signaling messages may be exchanged between the wireless communication device 115 and the WAN 105 over a wireless connection 130. To provide a wireless service to an authorized user, the wireless communication device 115 may automatically authenticate the user to the Wi-Fi network 120. An access point (AP) 125 may be associated with the Wi-Fi network 120 to provide access to data networks, such the Internet.

Examples of the WAN 105 include a Third Generation (3G) network based on a Universal Mobile Telecommunication System (UMTS) protocol, although it should be understood that the present invention may be applicable to other systems or protocols that support multi-media, data, optical, and/or voice communication. For instance, protocols like Code Domain Multiple Access (CDMA) and General Packet Radio Service (GPRS) for GSM networks may be used. That is, it should be understood, however, that the configuration of the client-server based communication system 100 of FIG. 1 is exemplary in nature, and that fewer or additional components may be employed in other embodiments of the client-server based communication system 100 without departing from the spirit and scope of the instant invention.

According to one embodiment, the WAN 105 may comprise one or more data networks, such an Internet Protocol (IP) network comprising the Internet and a public telephone system (PSTN). The WLAN 110 may comprise one or more at least one of hidden and visible Wi-Fi networks associated with the access point 125. Consistent with one embodiment of the instant application, the Wi-Fi network 120 may be based on a wireless network protocol that uses unregulated spectrum for establishing a connection, such as a wireless connection between the wireless communication device 115 and the Wi-Fi network 120. Over the wireless connection, for example, the user often communicates high-speed multimedia information including voice, data, and video content.

The wireless communication device 115 may take the form of any of a variety of devices, such as mobile terminals including cellular phones, personal digital assistants (PDAs), laptop computers, digital pagers, wireless cards, and any other device capable of accessing the wireless LAN 105. The WAN 105 may use base stations for establishing a communication link with the wireless communication device 115, such as for cellular WANs, for example. The access point 125 may support the provisioning of multiple virtual networks, identified by a service set identifier (SSID), which is a unique label that distinguishes one WLAN from another.

By automating an authentication process to the Wi-Fi network 120, the client-server based communication system 100 may provide simultaneous access to the access point 125 for many authorized users at a Wi-Fi hotspot 133. Of course, the Wi-Fi hotspot 133 is sometimes called the Wi-Fi network 120 itself. The authentication process may involve sending a request message 135 from the wireless communication device 115, and in turn, receiving a reply message 137 over the wireless connection 130, such as a wireless connection from the WAN 105. An example of the request and reply messages 135, 137 includes SMS messages. Of course, other forms of signaling messages capable of interactive transmission on a wireless medium, such as air interface are within the scope of the present invention, as persons of an ordinary skill in the art will recognize. Such signaling messages may enable exchange of information between the wireless communication device 115 and the Wi-Fi network 120 in the client-server based communication system 100. The server 170 may use the access point 125 to establish, monitor, and/or release the wireless connection 130.

For exchanging these SMS messages, i.e., the request and reply messages 135, 137 during the authentication process, the wireless communication device 115 may comprise a first and a second transceiver. While the first transceiver may enable access to the Wi-Fi network 120, the second transceiver, such as a modem 140 may provide access to the WAN 105, e.g., cellular networks. In one embodiment, the modem 140 may comprise a conventional controller 150a and a conventional storage 155a to store the Wi-Fi client module 145.

The first and second transceivers may collectively form a "client." Of course, in some embodiments the first and second networks may be the same such that the wireless communication device 115 may use a single transceiver as the "client."

The wireless communication device 115 may further comprise a Wi-Fi client module 145, in one embodiment. The Wi-Fi client module 145 may comprise instructions, such as a software program or a firmware that the controller 150a may execute. The Wi-Fi client module 145 may be defined at least in part by an Institute of Electrical and Electronics Engineers (IEEE) 802.11x standard, e.g., x=a, b, g etc.

Likewise, consistent with one embodiment, the access point 125 may comprise a Wi-Fi transceiver 160 and a Wi-Fi user module 162. The client-server based communication system 100 may cause the Wi-Fi user module 162 at the access point 125 to communicate with a server 170. To this end, the server 170 may comprise a conventional communication interface (COMM I/F) 172, a conventional controller 150b and a conventional storage 155b to store a server module 180. The server module 180 may comprise a Wi-Fi user authenticator 165. The Wi-Fi user authenticator 165 may comprise instructions, such as a software program or a firmware that the controller 150b may execute for providing network authentication. The server module 180 may be defined at least in part by an Institute of Electrical and Electronics Engineers (IEEE) 802.11x standard, where x is a, b, g etc.

To automate the authentication of a user within the client-server based communication system 100, the Wi-Fi client module 145 and the server module 180 may cooperatively use the Wi-Fi user authenticator 165. Upon entering the Wi-Fi hotspot 133 space, the request and reply messages 135, 137 may be exchanged between the modem 140 and the Wi-Fi user authenticator 165 through the WAN 105 without desiring user actions and/or involving the Wi-Fi network 120, in some embodiments. The wireless communication device 115 may indicate an authentication event 182 to the Wi-Fi network 120 at the Wi-Fi hotspot 133. The authentication event 182 may be generated when a user desires access to the Wi-Fi network 120 and/or the wireless communication device 115 interacts with the Wi-Fi hotspot 133 for accessing the Wi-Fi network 120.

In response to the authentication event 182, the Wi-Fi client module 145 may interact with the Wi-Fi user authenticator 165 of the server module 180 to allow the client 140 to connect to the access point 125 associated with the Wi-Fi network 120. The wireless communication device 115 may automatically obtain a credential 185 from the server module 180 for authenticating the user to the Wi-Fi network 120. The credential 185 may be an electronic certificate that may be recognized as proof of a party's identity and a security level. The credential 185 may represent a set of access permissions with media independent data attesting to, or establishing, the identity of an entity. The credential 185 may comprise one or more access tokens 190, which may be provided by the Wi-Fi user authenticator 165 for use in login onto the Wi-Fi network 120. In this manner, the user, at the wireless communication device 115 may automatically authenticate itself to the Wi-Fi network 120.

The access token(s) 190 may refer to an object that identifies a logged-on (authenticated) user. The access token(s) 190 may comprise a user's security ID, user group information to which the user belongs, and other security information. The access token(s) 190 may attach to a communications (COM) Port on the client-server based communication system 100. The access token(s) 190 may allow an authorized user to access the client-server based communication system 100.

Using the COM port, the wireless communication device 115 may communicate with the transceiver, such as the modem 140, i.e., "client."

A user may subscribe to a wireless service, such as a Wi-Fi wireless service to become an authorized user of the wireless communication device 115. That is, the authorized user may receive a subscription from the network operator(s)/service provider(s) 195 to use the WAN 105 and the WLAN 110. To this end, the server module 180 may cause the WAN 105 to control access to the Wi-Fi network 120 associated with the WLAN 110 when enabling one or more network operator(s)/service provider(s) 195 to provide the wireless service. Using the server module 180, in one embodiment, the network operator(s)/service provider(s) 195 may competitively provide a host of wireless services, such as public Wi-Fi services with high speed connections that many enterprise users desire on a public wireless LAN for a remote access. The server module 180 may be adapted to communicate with the Wi-Fi client module 145 for an operator among the network operator(s)/service provider(s) 195. The server module 180 may comprise instructions, such as a software program or a firmware that the controller 155b may execute for enabling the Wi-Fi user authenticator 165 to control authentication of the user to the Wi-Fi network 120.

Figure 2A:
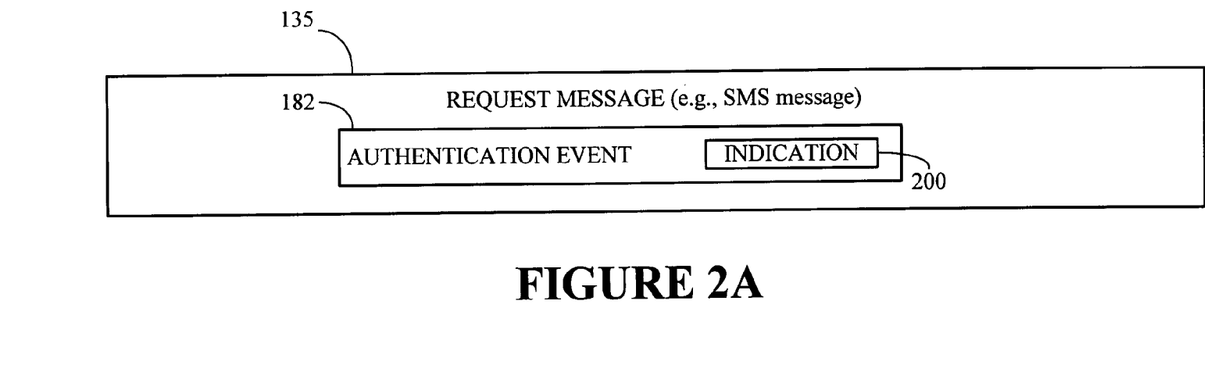
FIG. 2A schematically depicts one embodiment of a request message, such as a short service message for indicating an authentication event to a Wi-Fi hotspot such that the Wi-Fi client module interacts with a Wi-Fi user authenticator and a server module to allow the client to connect to an access point associated with the Wi-Fi network.

Turning now to FIG. 2A, which schematically depicts one embodiment of the request message 135, such as a short service message (SMS) which the wireless communication device 115 may transmit over the wireless connection 130 to the WAN 105 in the client-server based communication system 100 shown in FIG. 1. Upon entering the range of the Wi-Fi hotspot 133, the Wi-Fi client module 145, within the request message 135, may provide an indication 200 pertaining to occurrence of the authentication event 182 to the WAN 105 for the purposes of authenticating the user to the Wi-Fi network 120. Using such indication 200, the Wi-Fi user authenticator 165 of the server module 180 may interact with the Wi-Fi client module 145 to allow the transceiver, such as the modem 140, i.e., "client," to connect the wireless communication device 115 to the access point 125 associated with the Wi-Fi network 120.

Figure 2B:
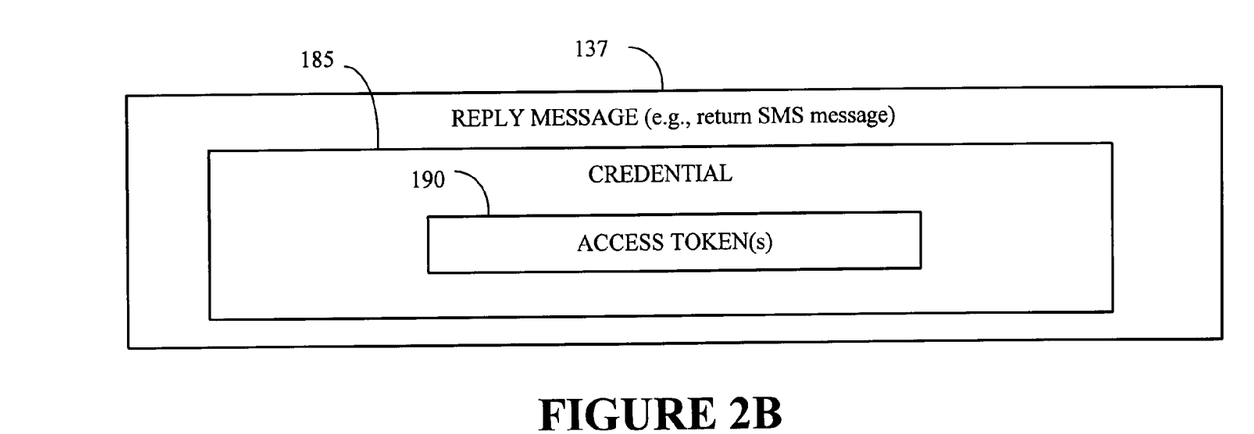
FIG. 2B schematically depicts one embodiment of a reply message, such as a return short service message for providing a credential including one or more access tokens.

As shown, FIG. 2B schematically depicts one embodiment of the reply message 137. For example, the reply message 137 may refer to a return SMS provided by the WAN 105 in the client-server based communication system 100 over the wireless connection 130 in response to the request message 135 from the wireless communication device 115, as shown in FIG. 1. The reply message 137 may provide the credential 185 including the one or more access tokens 190 to the wireless communication device 115 to authenticate, the user of a wireless service at the wireless communication device 115, to the Wi-Fi network 120.

Figure 3:
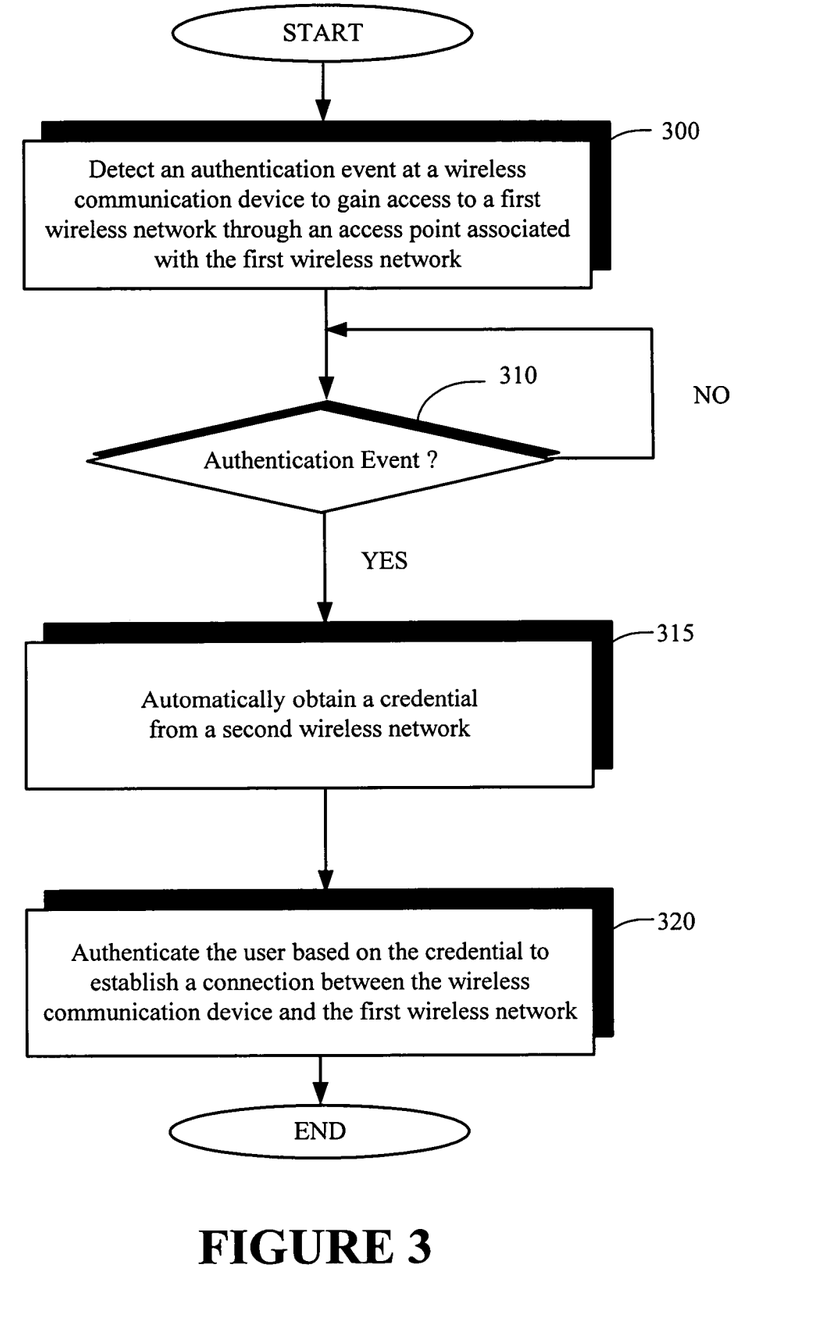
FIG. 3 illustrates a stylized representation of a flow chart implementing a method for automating user authentication to the Wi-Fi network over the wireless connection with the wide area network when rendering a wireless service to the user consistent with one embodiment of the present invention.

Consistent with one embodiment of the present invention, FIG. 3 illustrates a stylized representation of a flow chart implementing a method for automating user authentication to the Wi-Fi network 120 over the wireless connection 130. To provide a wireless service to the user on the WLAN 110, at block 300, the Wi-Fi client module 145 at the wireless communication device 115 may detect the authentication event 182 at the wireless communication device 115 to gain access to a first wireless network, such as the Wi-Fi network 120 through the access point 125. Likewise, a base station of a cellular network may be associated with a second wireless network, i.e., the WAN 105. A check at a decision block 310 may monitor the wireless communication device 115 for occurrence of the authentication event 182.

In response to the authentication event 182, the Wi-Fi client module 145 at the wireless communication device 115 may signal the second wireless network, i.e., the WAN 105 over the wireless connection 130 to automatically obtain the credential 185 therefrom, as indicated in block 315. Using the credential 185, at block 320, the Wi-Fi client module 145 may authenticate the user based on the credential 185 to establish a connection between the wireless communication device 115 and the first wireless network, i.e., the Wi-Fi network 120. By providing the credential 185 in a signaling session with the Wi-Fi client module 145 in response to the authentication event 182 from the server module 180, the WAN 105 may automatically connect the wireless communication device 115 to the Wi-Fi network 120.

Figure 4:
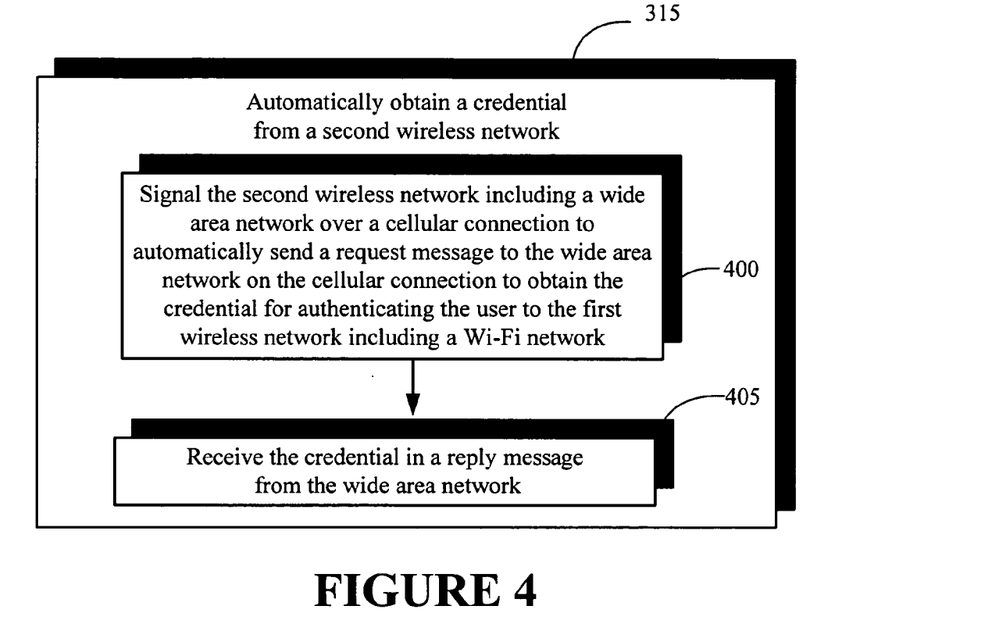
FIG. 4 is a flow diagram illustrating one embodiment of signaling employed in the client-server based communication system of FIG. 1 for automatically obtaining the credential shown in FIG. 2B.

Referring to FIG. 4, a flow diagram illustrates one embodiment of signaling employed in the client-server based communication system 100 of FIG. 1 for automatically obtaining the credential 185 from the second wireless network, i.e., the WAN 105, as shown in FIG. 2B. The Wi-Fi client module 145 may signal the second wireless network i.e., the WAN 105 over the wireless connection 133, e.g., a wireless connection to automatically send the request message 135 to the WAN 105 on the wireless connection to obtain the credential 185 for authenticating the user to the first wireless network, i.e., the Wi-Fi network 120, at block 400. In response, as indicated in block 405, the wireless communication device 115 may receive the credential 185 in the reply message 137 from the WAN 105.

Specifically, the server module 180 may communicate with the Wi-Fi client module 145 to provide the access token(s) 190 to the wireless communication device 115 for authenticating the user to the Wi-Fi network 120. Based on the access token(s) 190, the Wi-Fi client module 145 may send an indication for a user authentication through the transceiver, the modem 140, i.e., "client" to the Wi-Fi transceiver 160. The Wi-Fi user module 162 may establish a connection with the wireless communication device 115 to make the Wi-Fi network 120 accessible to the user based on the indication for the user authentication received from the Wi-Fi client module 145.

Figure 5:
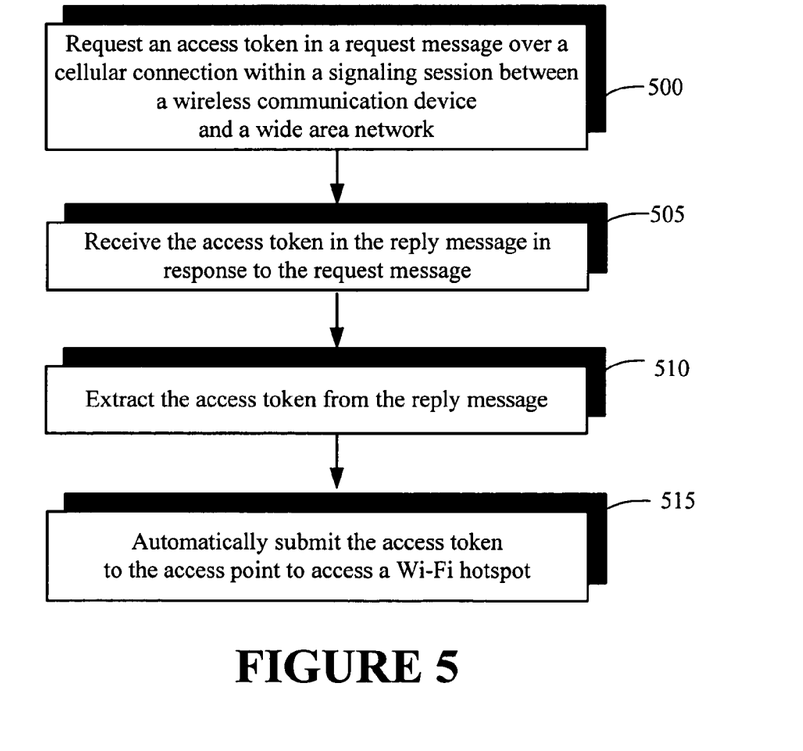
FIG. 5 is a flow diagram illustrating one embodiment of providing the one or more access tokens to the Wi-Fi client module at the wireless communication device to login onto the Wi-Fi network through the access point.

Turning now to FIG. 5, a flow diagram illustrates one embodiment of providing the one or more access tokens 190 to the Wi-Fi client module 145 at the wireless communication device 115 to login onto the Wi-Fi network 120 through the access point 125. At block 500, the Wi-Fi client module 145 may request an access token in the request message 135 over the wireless connection 130, e.g., a communication link over an air interface within a signaling session between the wireless communication device 115 and the WAN 105. The signaling session may involve transmission of service information (e.g., addressees) between the Wi-Fi client module 145 and the server module 180.

The access token 190 may be received in the reply message 137, at block 505. Pursuant to on embodiment, the access token 190 may be extracted from the reply message 137 at the block 515. To enable a user to automatically access the Wi-Fi hotspot 133, the wireless communication device 115 may automatically submit the access token 190 to the access point 125, as set forth in block 515. Without deviating from the spirit of the present invention, rather than sending the access token 190, in one embodiment, an indication as to the access token 190 may only be submitted to the access point 125 by the Wi-Fi client module 145.

Figure 6:
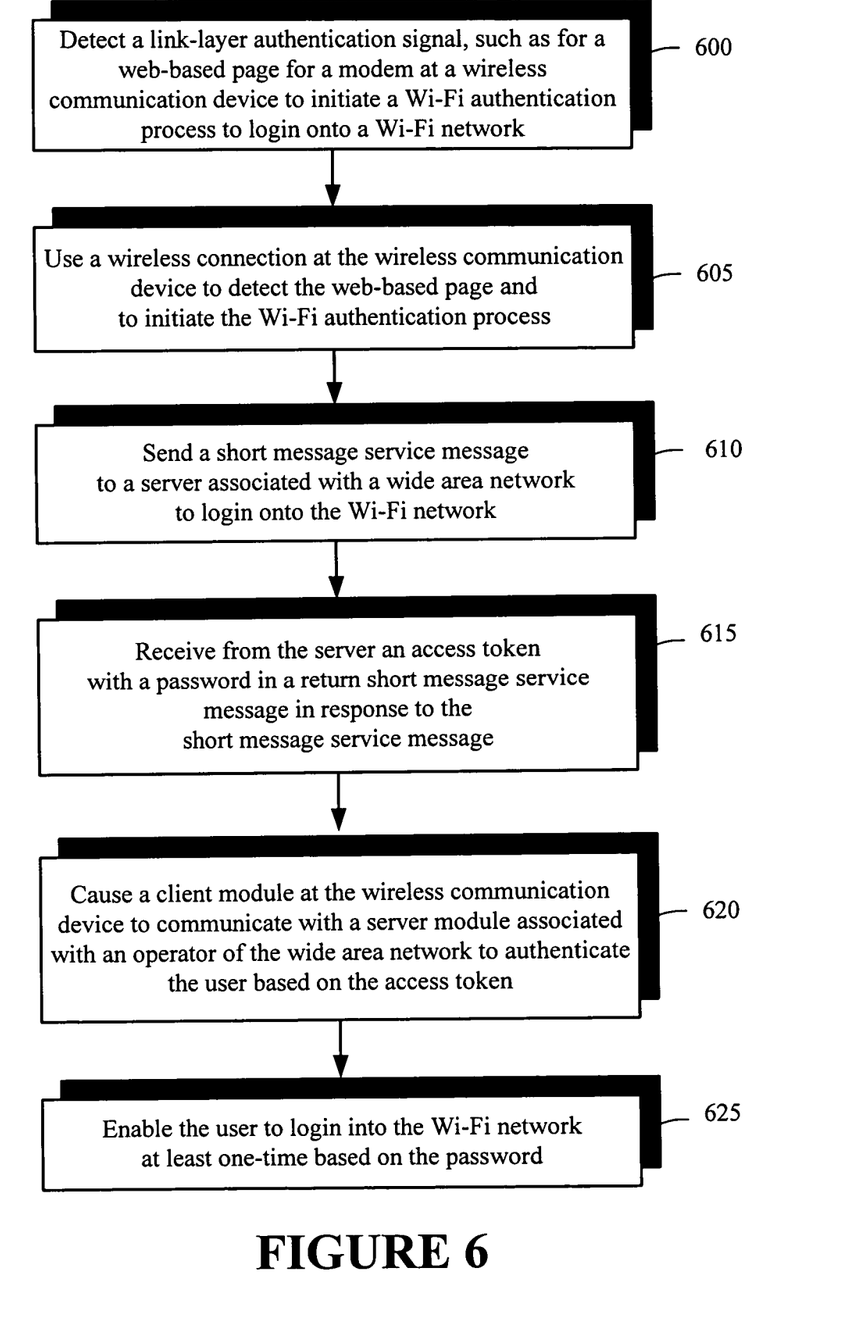
FIG. 6 is a flow diagram illustrating one embodiment of detecting a web-based page for a modem at the wireless communication device to initiate a Wi-Fi authentication process for login onto the Wi-Fi network.

Finally, FIG. 6 shows a flow diagram illustrating one embodiment in which the Wi-Fi client module 145 may detect a link-layer authentication signal, such as a web-based page in a web browser. For the modem 140, i.e., "client," the Wi-Fi client module 145 at the wireless communication device 115 may initiate a Wi-Fi authentication process that enables the user to login onto the Wi-Fi network 120, at block 600. According to one embodiment, the Wi-Fi client module 145 may use a wireless connection from the wireless communication device 115 to the WLAN 110 to detect the web-based page and to initiate the Wi-Fi authentication process, as shown in block 605.

By sending a SMS message in the request message 135 to the server 170 for an operator, such as the network operator/service provider 195 over the WAN 105, the Wi-Fi client module 145 may obtain an access token, i.e., the access token(s) 190 to login onto the Wi-Fi network 120, e.g., though the access point 125, in block 610. In response to the SMS message, at block 615, the wireless communication device 115 may receive from the server 170 associated with the WAN 105, the access token with a password in a return SMS message that corresponds to the reply message 137 shown in FIG. 1, according to on embodiment of the instant invention.

The reply message 137 may cause the Wi-Fi client module 145 at the wireless communication device 115 to communicate with the server module 180 associated with an operator of the WAN 105 to authenticate the user based on the access token, at block 620. That is, for the purposes of network authentication, the wireless communication device 115 using the Wi-Fi client module 145 may communicate with the server module 180 associated with an operator, i.e., the network operator/service provider 195. At block 625, based on the password, the Wi-Fi client module 145 may enable the user to login into the Wi-Fi network 120, at least one-time.

In this way, according to some embodiments of the present invention, the user may avoid performing various manual steps for user authentication when using a wireless service. That is, a number of manual actions by the user and an understanding of an authentication process for sending and receiving SMS messages may be substantially avoided. For example, sending of an SMS message and typing an access token upon reception of a return SMS may be automated for logging onto a login web-page to gain access to the access point 125 associated with the Wi-Fi network 120.

Therefore, the client-server based communication system 100 may significantly simplify accessing the Wi-Fi hotspot 133, especially when performing the above illustrated authentication process which involves sending and receiving SMS messages to obtain an access token. This automatic authentication of the user may substantially reduce, if not completely eliminate a number of manual steps otherwise used when authentication to the Wi-Fi hotspot 133 using the SMS messages. In fact, by providing a desired user experience with a relatively fast user authentication, user-acceptance of a particular wireless communication device and/or a wireless service may be advantageously increased.

The wireless communication device 115 may be a fixed location or a mobile device and incorporate wireless protocols, such as IEEE 802.11, IEEE 802.11a, IEEE 802.11b, Bluetooth, or the like for communicating with a network, such as a wireless local area network. The wireless communication device 115 may be in data communication with the server 170 through the access point(s) 125. The access point(s) 125 may communicate with the server 170 over an Ethernet wired network. The transmission and reception of data may use a TCP/IP protocol, and the WAN 105 may be connected to the Internet. Each of the wireless communication device(s) 115 may associate with one of the access point(s) 125. Each access point 125 may determine which of the communications received over the Ethernet link from the server 170 is destined for a specific wireless communication device associated with that particular access point.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for authentication of a user of a wireless communication device, the method comprising:

transmitting, from the wireless communication device, a request to gain access to a first wireless network through an access point associated with said first wireless network over a first air interface between the wireless communication device and the access point, the request being transmitted to a second wireless network over a second air interface between the wireless communication device and a base station in the second wireless network;

receiving, at the wireless communication device in response to transmitting the request, a credential transmitted from the second wireless network over the second air interface, the credential being obtained from an authentication server and provided to the second wireless network for transmission to the wireless communication device over the second air interface, wherein the credential includes information that authenticates the user to the first wireless network; and authenticating said user to establish a connection between said wireless communication device and said first wireless network over the first air interface, said authentication being performed using the credential and a password known to the user and the authentication server.

2. The method, as set forth in claim 1, wherein said first wireless network comprises a Wi-Fi network and said second wireless network comprises a wide area network, and wherein transmitting the request to the second wireless network comprises:
   automatically transmitting the request to the wide area network over the second air interface automatically obtain said credential for authenticating said user to the Wi-Fi network in response to the wireless communication device entering a hotspot of the Wi-Fi network.

3. The method, as set forth in claim 2, further comprising:
   in response to transmitting the request, receiving said credential in a reply message from said wide area network over the second air interface.

4. The method, as set forth in claim 3, wherein receiving the credential from the second wireless network further comprises:
   receiving an access token including a security identifier of the user that authenticates the user to the first wireless network.

5. The method, as set forth in claim 4, further comprising:
   automatically submitting said access token to said access point over the first air interface to access a Wi-Fi hotspot.

6. The method, as set forth in claim 3, wherein automatically sending a request message further comprising:
   sending a short message service message over the second air interface said wide area network to request the access token so that the wireless communication device can use the access token to login onto said Wi-Fi network.

7. The method, as set forth in claim 6, wherein receiving said credential in a reply message further comprising:
   in response to said short message service message, receiving said access token in a return short message service message over the second air interface.

8. The method, as set forth in claim 7, wherein transmitting the request comprises transmitting the request in response to:
   detecting a link-layer authentication signal that initiates a Wi-Fi authentication process for login onto a Wi-Fi network for a modem at said wireless communication device; and
   using the first air interface from said wireless communication device to a wireless local area network to detect a web-based page.

9. The method, as set forth in claim 8, wherein using the first air interface further comprising:
   in response to said short message service message, receiving from said wide area network said access token with a password in said return short message service message over the second air interface;
   causing a client module at said wireless communication device to communicate with a server module associated with an operator of said wide area network to authenticate said user based on said access token; and
   enabling said user to login into said Wi-Fi network at least one-time by transmitting said password over the first air interface.

10. The method, as set forth in claim 3, wherein automatically sending a request message further comprising:
    using a packet-based data connection capable of exchanging Internet protocol data packets to send said request message to a server over the second air interface to said wide area network.

11. A client-server based communication system to automate authentication of a user to a first wireless network, said client-server based communication system associated with a second wireless network comprising:
    a client including a storage storing instructions for detecting an authentication event at a wireless communication device to gain access to said first wireless network through an access point associated with said first wireless network over a first air interface between the wireless communication device and the access point, in response to said authentication event, automatically obtaining a credential from said second wireless network over a second air interface between the wireless communication device and a base station in the second wireless network, wherein the credential includes information that authenticates the user to the first wireless network, and authenticating said user based on said credential and a password known to the user to establish a connection between said wireless communication device and said first wireless network over the first air interface; and
    a server adapted to communicate with said client for an operator, said server including a storage storing instructions to automatically authenticate said user to said first wireless network in response to said authentication event by providing said credential in a signaling session with said client over said second wireless network for connecting said wireless communication device to said first wireless network over the first air interface, the server also using the password known to the user to authenticate the user.

12. The client-server based communication system, as set forth in claim 11, wherein said client storage stores further instructions for said client to signal said second wireless network including a wide area network over the second air interface to automatically send a request message over the second air interface to said wide area network to obtain said credential for authenticating said user to said first wireless network including a Wi-Fi network.

13. The client-server based communication system, as set forth in claim 12, wherein said client storage stores further instructions for said client to receive said credential in a reply message over the second air interface from said wide area network in response to said request message.

14. The client-server based communication system, as set forth in claim 13, wherein said client storage stores further instructions for said client to request an access token in said request message over the second air interface within a signaling session of said wireless communication device and said wide area network.

15. The client-server based communication system, as set forth in claim 14, wherein said client storage stores further instructions for said client to extract said access token from said reply message and automatically submit said access token to said access point over the first air interface to access a Wi-Fi hotspot associated with said Wi-Fi network.

16. A client in a client-server based communication system to automate authentication of a user to a first wireless network, said client associated with a second wireless network comprising:
    a controller; and
    a storage coupled to said controller, said storage storing instructions for detecting an authentication event at a wireless communication device to gain access to said first wireless network through an access point associated with said first wireless network over a first air interface between the wireless communication device and the access point, in response to said authentication event, automatically obtain over a second air interface between the wireless communication device and a base station in the second wireless network a credential from said second wireless network that receives said credential from an authentication server, wherein the credential includes information that authenticates the user to the first wireless network, and authenticate said user based on said credential and a password known to the user and the authentication server to establish a connection between said wireless communication device and said first wireless network over the first air interface.

17. The client, as set forth in claim 16, wherein said client is being defined at least in part by an Institute of Electrical and Electronics Engineers 802.11x standard.

18. The client, as set forth in claim 16, wherein said client further comprises:
   a transceiver including a modem to:
   detect a link-layer authentication signal that initiates a Wi-Fi authentication process for login onto said first wireless network including a Wi-Fi network;
   send a short message service message to a server over the second air interface with the wide area network; and
   receive an access token in a return short message service message transmitted over the second air interface in response to said short message service message.

19. The client, as set forth in claim 18, wherein said transceiver uses the first air interface to detect a web-based page.

20. The client, as set forth in claim 19, wherein said modem to receive from said wide area network said access token with a password in said return short message service message in response to said short message service message, cause a client module at said wireless communication device to communicate with a server module associated with an operator of said wide area network to authenticate said user based on said access token, and enable said user to login into said Wi-Fi network at least one-time based on said password.

21. The method of claim 1, wherein receiving the credential comprises receiving an electronic certificate that is recognized as proof of the user's identity and a security level.

22. The method of claim 1, wherein receiving the credential comprises receiving a set of access permissions with media independent data attesting to the identity of the user or establishing the identity of the user.

23. The client-server based communication system of claim 11, wherein the credential comprises an electronic certificate that is recognized as proof of the user's identity and a security level.

24. The client-server based communication system of claim 11, wherein the credential comprises a set of access permissions with media independent data attesting to the identity of the user or establishing the identity of the user.

25. The client, as set forth in claim 19, wherein the credential comprises an electronic certificate that is recognized as proof of the user's identity and a security level.

26. The client, as set forth in claim 19, wherein the credential comprises a set of access permissions with media independent data attesting to the identity of the user or establishing the identity of the user.

* * * * *